United States Patent
Hatade et al.

(10) Patent No.: US 7,260,048 B2
(45) Date of Patent: Aug. 21, 2007

(54) OBJECT LENS FOR OPTICAL PICKUP AND METHOD FOR DESIGNING THE SAME

(75) Inventors: Koei Hatade, Osaka (JP); Kazutoshi Onozawa, Osaka (JP)

(73) Assignees: Nalux Co., Ltd., Osaka (JP); Matsushita Electric Industrial Co., Ltd., Osaka (JP)

( * ) Notice: Subject to any disclaimer, the term of this patent is extended or adjusted under 35 U.S.C. 154(b) by 551 days.

(21) Appl. No.: 10/635,649

(22) Filed: Aug. 7, 2003

(65) Prior Publication Data

US 2004/0027972 A1    Feb. 12, 2004

(30) Foreign Application Priority Data

Aug. 7, 2002  (JP) .............................. 2002-229585

(51) Int. Cl.
*G11B 7/00*    (2006.01)

(52) U.S. Cl. .............................. 369/112.26; 369/112.23

(58) Field of Classification Search ........... 369/112.26, 369/112.23
See application file for complete search history.

(56) References Cited

U.S. PATENT DOCUMENTS

| | | | | |
|---|---|---|---|---|
| 5,404,009 | A * | 4/1995 | Kando et al. .......... | 250/227.24 |
| 5,956,259 | A * | 9/1999 | Hartsell et al. .............. | 700/302 |
| 6,118,749 | A * | 9/2000 | Arai et al. ............. | 369/112.26 |
| 6,728,193 | B1 * | 4/2004 | Uchizaki et al. ....... | 369/112.01 |
| 7,075,880 | B2 * | 7/2006 | Honda et al. .......... | 369/112.08 |
| 7,177,259 | B2 * | 2/2007 | Nishi et al. ............. | 369/112.16 |
| 2001/0000310 | A1 * | 4/2001 | Yoo et al. ............... | 369/112.26 |
| 2002/0150035 | A1 * | 10/2002 | Bernacki et al. ............ | 369/300 |

FOREIGN PATENT DOCUMENTS

| | | |
|---|---|---|
| JP | 01196585 | 8/1989 |
| JP | 06-163988 A | 6/1994 |
| JP | 07-302437 A | 11/1995 |
| JP | 09-270145 A | 10/1997 |
| JP | 10-021574 * | 1/1998 |
| JP | 10-021574 A | 1/1998 |
| JP | 10-255305 A | 9/1998 |
| JP | 11-96585 A | 4/1999 |
| JP | 11186651 | 7/1999 |
| JP | 2000-011417 A | 1/2000 |

(Continued)

OTHER PUBLICATIONS

Foreign Office Action, and English translation thereof, dated Feb. 27, 2007 for JP Patent Application No. 2002-229585.

*Primary Examiner*—Wayne Young
*Assistant Examiner*—Van T. Pham
(74) *Attorney, Agent, or Firm*—McDermott Will & Emery LLP

(57) ABSTRACT

An optical pickup records data in or reproduces data from optical recording media respectively having recording faces at different heights, and includes a semiconductor laser diode array having light emitting portions for respectively emitting laser beams of different wavelengths. A finite conjugate type object lens used in this optical pickup is designed so that the numerical aperture of the object lens can be controlled to be changed in accordance with switching between the different wavelengths for allowing a laser beam to be focused on each optical recording medium.

7 Claims, 16 Drawing Sheets

FOREIGN PATENT DOCUMENTS

| | | | |
|---|---|---|---|
| JP | 2000-306258 A | 11/2000 | |
| JP | 2000-348367 | * 12/2000 | |
| JP | 2001-076367 A | 3/2001 | |
| JP | 2001-283459 | 10/2001 | |
| JP | 2002-056569 A | 2/2002 | |
| JP | 2002-175639 | 6/2002 | |
| JP | 2002-203331 | 7/2002 | |

* cited by examiner

| | Focal length | | Effective diameter R1 φ | | Effective diameter R2 φ | |
|---|---|---|---|---|---|---|
| | DVD | CD | DVD | CD | DVD | CD |
| Design example 1 | 2.103 | 2.116 | 3.05 | 2.24 | 2.69 | 1.79 |
| Design example 2 | 2.307 | 2.319 | 3.26 | 2.41 | 2.72 | 1.83 |

| | TT | | OD | | CT | | WD | |
|---|---|---|---|---|---|---|---|---|
| | DVD | CD | DVD | CD | DVD | CD | DVD | CD |
| Design example 1 | 18.724 | 18.963 | 15.254 | 15.254 | 1.570 | 1.570 | 1.300 | 0.938 |
| Design example 2 | 20.418 | 20.657 | 16.358 | 16.358 | 2.159 | 2.159 | 1.300 | 0.939 |

FIG. 4

| | | Region for DVD and CD | Region for CD (partly including region for DVD) | Region for DVD |
|---|---|---|---|---|
| | | R1 face | R2 face (A region) | R2 face (B region) |
| Center thickness (mm) | | 1.57026 | — | — |
| Effective (region) diameter ($\phi$) (mm) | | 3.050 | 1.787 | 2.692 |
| Curvature (R) (mm) | | 1.47929 | $-2.81207$ | $-2.79098$ |
| K | | $-1.24492$ | 0.00000 | 0.00000 |
| $A_4$ | | $1.91049E \times 10^{-2}$ | $6.57018E \times 10^{-2}$ | $7.06736E \times 10^{-2}$ |
| $A_6$ | | $2.92900E \times 10^{-3}$ | $-1.33152E \times 10^{-2}$ | $-1.35424E \times 10^{-2}$ |
| $A_8$ | | $3.53749E \times 10^{-4}$ | $2.43982E \times 10^{-3}$ | $1.42971E \times 10^{-3}$ |
| $A_{10}$ | | $0.00000E \times 10^{0}$ | $0.00000E \times 10^{0}$ | $0.00000E \times 10^{0}$ |
| Step (mm) | | — | $-0.001481$ | — |

FIG. 5

| | Region for DVD and CD | Region for CD (partly including region for DVD) | Region for DVD |
|---|---|---|---|
| | R1 face | R2 face (A region) | R2 face (B region) |
| Center thickness (mm) | 2.159346 | --- | --- |
| Effective (region) diameter ($\phi$) (mm) | 3.252 | 1.826 | 2.714 |
| Curvature (R) (mm) | 1.7036 | $-2.39375$ | $-2.38194$ |
| K | $-1.272987$ | 0.00000 | 0.00000 |
| $A_4$ | $7.16899E \times 10^{-3}$ | $5.58818E \times 10^{-2}$ | $5.95038E \times 10^{-2}$ |
| $A_6$ | $5.24988E \times 10^{-4}$ | $-1.36935E \times 10^{-2}$ | $-1.26669E \times 10^{-2}$ |
| $A_8$ | $-2.76338E \times 10^{-4}$ | $3.34402E \times 10^{-3}$ | $1.85528E \times 10^{-3}$ |
| $A_{10}$ | $0.00000E \times 10^{0}$ | $0.00000E \times 10^{0}$ | $0.00000E \times 10^{0}$ |
| Step (mm) | --- | $-0.001422$ | 0.001422 |

Design example 1: Optical path for DVD 2.50mm

Design example 1: Optical path for CD 2.50mm

Design example 2: Optical path for DVD 2.50mm

Design example 2: Optical path for CD 2.50mm

FIG. 8

|  | Optical magnification | |
|---|---|---|
|  | DVD | CD |
| Design example 1 | − 0.167 | − 0.168 |
| Design example 2 | − 0.167 | − 0.168 |

Design example 1: For DVD

Design example 1: For CD (numerical aperture not limited)

Design example 2: For DVD

Design example 2: For CD (numerical aperture not limited)

Design example 1:
Point image intensity distribution in DVD

Design example 1:
Point image intensity distribution in CD
(Numerical aperture not limited)

Comparative design example:
Point image intensity distribution in CD
(Numerical aperture not limited)

Design example 2:
Point image intensity distribution in DVD

Design example 2:
Point image intensity distribution in CD
(Numerical aperture not limited)

Comparative design example:
Point image intensity distribution in CD
(Numerical aperture not limited)

FIG. 13

| | Spot diameter (μm) | | | | | | Side robe (%) | | |
| --- | --- | --- | --- | --- | --- | --- | --- | --- | --- |
| | Numerical aperture not limited | | | Numerical aperture limited | | | | | |
| | DVD | | CD | | DVD | | CD | | |
| | DVD | CDX | CDY | CDX | CDY | DVD | CD | CD Numerical aperture limited | |
| Design example 1 | 0.897 | 1.406 | 1.437 | 1.455 | 1.450 | 3.25 | 3.17 | 1.86 | |
| Design example 2 | 0.912 | 1.445 | 1.448 | 1.441 | 1.449 | 2.23 | 2.36 | 2.06 | |

FIG. 14A
Masking for lens for DVD (shielding portion)
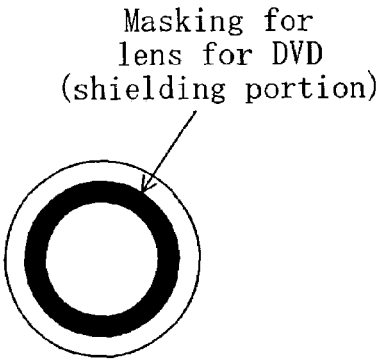
FIG. 14B
Masking for lens for CD (shielding portion)
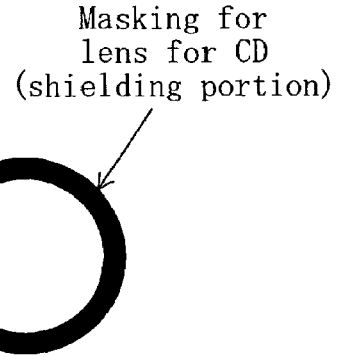
FIG. 14C
|     |              | Wave aberration ($\lambda$ RMS) | Spot diameter ($\mu$m) | Side robe (%) |
|-----|--------------|-------------|---------|------|
| DVD | With mask    | 0.0172 | 0.89×0.89 | 2.47 |
| DVD | Without mask | 0.3325 | 0.89×0.89 | 2.30 |
| CD  | With mask    | 0.0066 | 1.45×1.45 | 1.79 |
| CD  | Without mask | 1.5278 | 1.44×1.45 | 1.79 |
FIG. 14D
|     |              | Wave aberration ($\lambda$ RMS) | Spot diameter ($\mu$m) | Side robe (%) |
|-----|--------------|-------------|---------|------|
| DVD | With mask    | 0.0238 | 0.90×0.90 | 1.37 |
| DVD | Without mask | 0.1941 | 0.91×0.91 | 1.37 |
| CD  | With mask    | 0.0265 | 1.46×1.47 | 2.12 |
| CD  | Without mask | 1.3776 | 1.43×1.40 | 2.05 | ns
OBJECT LENS FOR OPTICAL PICKUP AND METHOD FOR DESIGNING THE SAME

BACKGROUND OF THE INVENTION

The present invention relates to an object lens used for recording/reproducing data in/from an optical recording medium, and more particularly, it relates to an object lens for use in an optical pickup of finite conjugate type that can attain good focusing characteristics in accordance with any of two kinds of optical recording media different in the substrate thickness, and a method for designing the object lens.

A general DVD reproducing apparatus needs not only a reproducing function for a DVD but also a reproducing function for a compact disk (CD) and a reproducing or recording function for a write once CD (CD-R) that has recently been rapidly spread. Reproducing light used for reproducing data from a DVD is red laser of a wavelength of a 650 nm band, and reproducing light used for reproducing data from a CD or CD-R is infrared laser of a wavelength of a 780 nm band. Accordingly, a current DVD reproducing apparatus includes two semiconductor laser diodes, that is, a red semiconductor laser diode for generating a red laser beam and an infrared semiconductor laser diode for generating an infrared laser beam.

Also, in accordance with demands for downsizing of information equipment such as a personal computer, it is necessary to downsize a DVD reproducing apparatus. In order to downsize a DVD reproducing apparatus, it is indispensable to reduce the size and the thickness of an optical pickup. For reducing the size and the thickness of an optical pickup, the optical system of the optical pickup is simplified. As one of the methods for simplifying the optical system, compatibility between a DVD and a CD is attained by using a single object lens. Specifically, although there are differences, such as the thickness of the disk substrate, the wavelength of laser used for irradiation and the numerical aperture NA of an object lens used in the irradiation with the laser, between a DVD and a CD, a system for attaining compatibility between a DVD and a CD by using a single object lens has been proposed.

For example, according to the description of Japanese Laid-Open Patent Publication No. 11-96585, as shown in FIGS. 16A and 16B, first luminous flux Sd1 passing in the vicinity of the optical axis of an object lens is used for the recording/reproducing in a first focusing position and for the recording/reproducing in a second focusing position, second luminous flux Sd2 passing outside the first luminous flux Sd1 is mainly used for the recording/reproducing in the second focusing position, and third luminous flux Sd3 passing outside the second luminous flux Sd2 is mainly used for the recording/reproducing in the first focusing position.

In this case, a collimating lens is inserted between the object lens and laser used as the light source, so that parallel rays can enter the object lens. Therefore, the lens can be easily designed so that the numerical aperture NA and the focusing position of the object lens can be changed in accordance with any of different thicknesses of a disk substrate and different wavelengths of the laser.

However, in order to make parallel rays always enter the object lens displaced in accordance with the variation of the disk, it is necessary to use a collimating lens sufficiently large as compared with the displacement of the object lens. As a result, even when a single object lens is used, the optical system is infinite and hence the optical path is long because the collimating lens is large, which disadvantageously prevents the downsizing of the whole apparatus.

Also, for reducing the size and the thickness of an optical pickup, a finite conjugate type object lens that can be singly used in an optical system is preferably used. However, with respect to divergent rays, the angle of the light entering the object lens displaced in accordance with the variation of the disk is always changed, and therefore, in the case where the wavelength of the used light is also changed, such a lens is very difficult to design and has not been realized yet.

On the other hand, with respect to semiconductor laser diodes, integration of a red semiconductor laser diode and an infrared semiconductor laser diode has been started to realize. A current DVD reproducing apparatus includes two optical components respectively for a red semiconductor laser diode and an infrared semiconductor diode. Therefore, when the two laser diodes, that is, the red semiconductor laser diode and the infrared semiconductor laser diode, are integrated, an optical component can be shared between them, so that the size and the thickness of the optical pickup can be reduced.

For example, Japanese Laid-Open Patent Publication No. 11-186651 discloses a monolithic semiconductor laser diode array integrated on one substrate as shown in FIG. 17 as the integration of a red semiconductor laser diode and an infrared semiconductor laser diode.

In this case, a distance between the light emitting portion of the infrared semiconductor laser diode and the light emitting portion of the red semiconductor laser diode can be controlled in accordance with the accuracy in photolithography performed in semiconductor diffusion process. Therefore, as compared with the case where laser chips are assembled in a hybrid manner, each light emitting portion can be very accurately provided, so that the distance between the light emitting portions can be set to 270 μm or less.

SUMMARY OF THE INVENTION

In consideration of the aforementioned conventional disadvantages, according to the present invention, the technique that the distance between light emitting portions of a monolithic semiconductor laser diode array including light emitting portions integrated on one substrate for emitting light of different wavelengths can be very accurately set to 270 μm or less is utilized, and the relative position between an object lens and the light emitting portions is fixed. Thus, an object of the invention is easing design of a lens that can change its numerical aperture NA and its focusing position in accordance with divergent rays emitted from light emitting portions respectively of different wavelengths, whereby providing a finite conjugate type object lens applicable to different types of optical recording media.

In order to achieve the object, the object lens for an optical pickup of this invention is of finite conjugate type for use in an optical pickup capable of recording data in and reproducing data from a first optical recording medium and a second optical recording medium respectively having recording faces at different heights by irradiating the first optical recording medium and the second optical recording medium with a laser beam through the object lens. Specifically, the optical pickup includes a semiconductor laser diode array having light emitting portions for respectively emitting laser beams of different wavelengths, and the object lens is designed to have numerical aperture controlled to be changed in accordance with switching between the different wavelengths, whereby allowing the laser beam to be focused on the first optical recording medium or the second optical recording medium.

Owing to the above-described architecture, the distances from the respective light emitting portions of the semiconductor laser diode array for respectively emitting the laser beams of the different wavelengths to the object lens are substantially the same. Therefore, even when divergent rays of the finite optical system enter the object lens, the numerical aperture NA can be controlled to be changed in accordance with the switching of the wavelength of the irradiation light. Accordingly, the laser beam having passed through the object lens can be definitely focused on the recording face of the optical recording medium arbitrarily selected from a plurality of optical recording media different at the height of the recording face. Also, since the object lens of this invention is a finite conjugate type object lens, the optical pickup can be downsized. Furthermore, since the optical system of the optical pickup is a finite optical system and the number of optical components of the optical pickup is reduced, the optical pickup can be operated at a higher speed.

In the object lens of this invention, a relative positional relationship between the object lens and the semiconductor laser diode array is preferably fixed.

In the object lens of this invention, a distance between the light emitting portions of the semiconductor laser diode array is preferably 270 μm or less. Thus, wave aberration of a spot of the laser beam focused on each optical recording medium can fall in an allowable range.

In the object lens of this invention, change of the numerical aperture of the object lens is preferably controlled in accordance with the switching between the different wavelengths in such a manner that, in the case where a laser beam of a wavelength suitable to the first optical recording medium is allowed to pass through the object lens for irradiating the first optical recording medium, portions of the laser beam respectively passing through a circular center region including a lens optical axis and a ring-shaped intermediate region around the center region are focused on the recording face of the first optical recording medium, and that in the case where a laser beam of another wavelength suitable to the second optical recording medium is allowed to pass through the object lens for irradiating the second optical recording medium, portions of the laser beam respectively passing through the center region and a ring-shaped peripheral region around the intermediate region are focused on the recording face of the second optical recording medium. Thus, the focusing position and the numerical aperture NA can be changed in accordance with the thickness of the substrate of the optical recording medium. In this case, the center region and the intermediate region are preferably defined by an identical lens function.

In the method of this invention for designing an object lens for an optical pickup, the object lens to be designed is of finite conjugate type for use in an optical pickup capable of recording data in or reproducing data from a first optical recording medium and a second optical recording medium respectively having recording faces at different heights by irradiating the first optical recording medium and the second optical recording medium with a laser beam through the object lens. Specifically, in the case where the object lens is disposed in a position fixed against a semiconductor laser diode array including light emitting portions for respectively emitting laser beams of different wavelengths, numerical aperture of the object lens is controlled to be changed in accordance with switching between the different wavelengths for allowing the laser beam to be focused on the first optical recording medium or the second optical recording medium.

Thus, even when divergent rays of the finite optical system enter the object lens, the numerical aperture NA can be controlled to be changed in accordance with the switching of the wavelength of the irradiation light, so that the divergent rays can be focused on the optical recording medium.

BRIEF DESCRIPTION OF THE DRAWINGS

FIG. 4 is a table for showing values of the design parameters including aspherical coefficients and the like employed in the design example 1 based on the method for designing an object lens according to the embodiment of the invention;

FIG. 5 is a table for showing values of the design parameters including aspherical coefficients and the like employed in the design example 2 based on the method for designing an object lens according to the embodiment of the invention;

FIG. 8 is a table of optical magnifications of the object lenses designed by the design example 1 and the design example 2 based on the method for designing an object lens according to the embodiment of the invention;

FIG. 13 is a table of values of spot diameters and side lobes obtained from the distributions of point image intensity shown in FIGS. 11A through 11C and 12A through 12C;

FIG. 14A is a diagram for showing a state where the object lens designed by the design example 1 based on the method for designing an object lens according to the embodiment of the invention is provided, as a mask for a DVD, with a ring-shaped mask for shielding an intermediate region corresponding to the numerical aperture NA of 0.3 through 0.45, FIG. 14B is a diagram for showing a state where the object lens designed by the design example 1 based on the method for designing an object lens according to the embodiment of the invention is provided, as a mask for a CD, with a ring-shaped mask for shielding a peripheral region corresponding to the numerical aperture NA of 0.45 through 0.6, FIG. 14C is a table of wave aberration, spot diameters and side lobes measured when the object lenses of FIG. 14A and 14B are used for a DVD and a CD, and FIG. 14D is a table of values measured in the same manner as FIG. 14C when the object lenses are designed with the intermediate region corresponding to the numerical aperture NA of 0.35 through 0.45;

DETAILED DESCRIPTION OF THE INVENTION

Figure 1A:
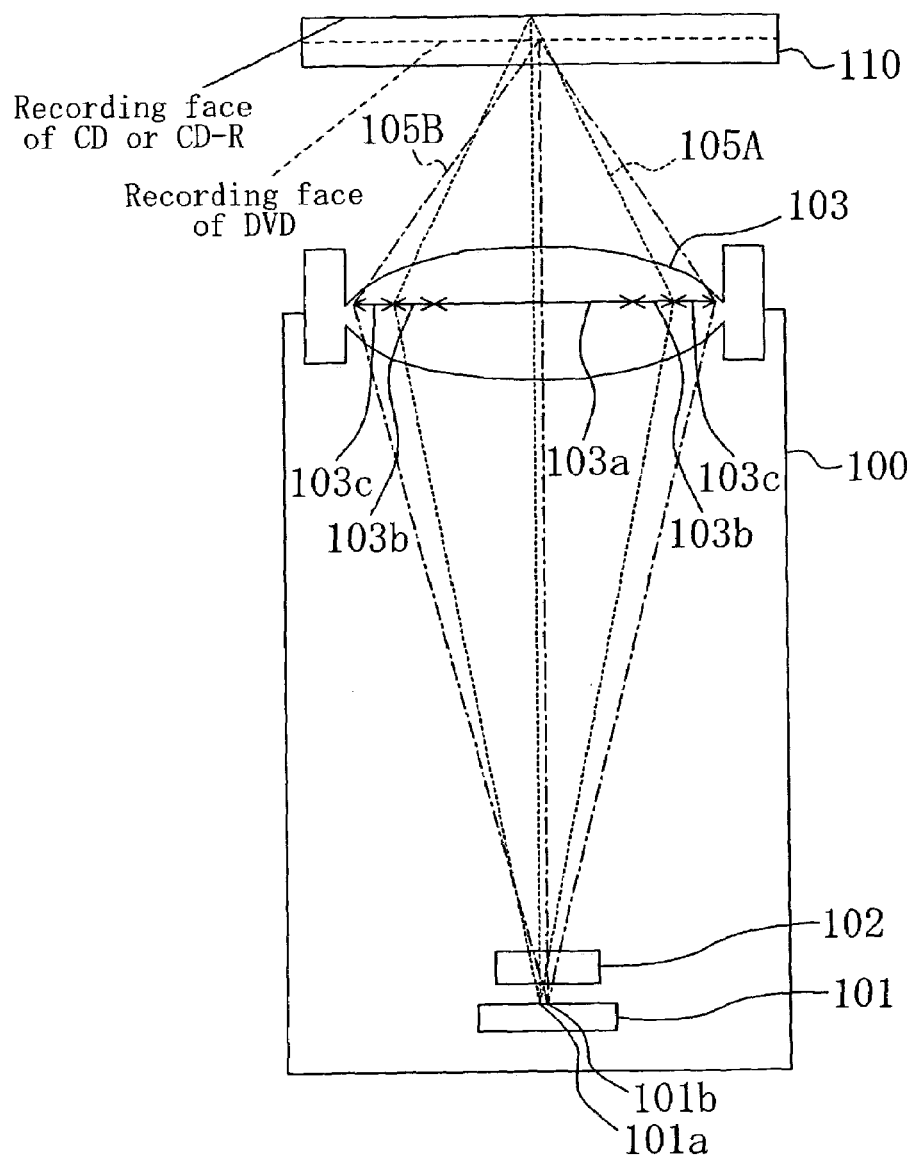
FIG. 1A is a schematic diagram for showing the architecture of an optical pickup including an object lens according to an embodiment of the invention and FIG. 1B is a front view for showing respective regions of the object lens of the embodiment.

Now, an object lens for an optical pickup and a method for designing the same according to a preferred embodiment of the invention will be described with reference to the accompanying drawings. It is noted that the drawings referred to below are schematically but sufficiently shown for understanding the present invention, and it goes without saying that the present invention is not limited to examples shown in the drawings.

Figure 1B:
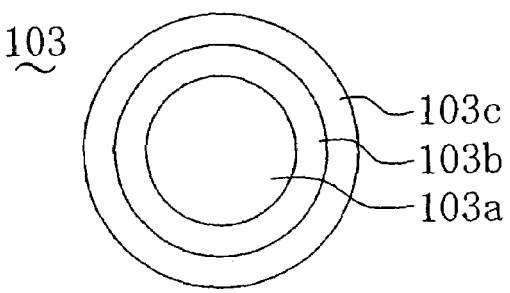

FIG. 1A is a schematic diagram for showing the architecture of an optical pickup including an object lens according to this embodiment, and FIG. 1B is a front view for showing respective regions of the object lens of the embodiment.

As shown in FIG. 1A, the optical pickup 100 is constructed as a unit in which an LD/PD integration unit 101, a diffraction optical device 102 and the object lens 103 (according to this embodiment) are integrally fixedly arranged, and its face having the object lens 103 opposes an optical recording medium 110 to be recorded/reproduced. The LD/PD integration unit 101 is built as one component in which a semiconductor laser diode (LD) array including a first light emitting portion 101a and a second light emitting portion 101b for respectively emitting light of different wavelengths, and a photo detector (PD) are integrated. In other words, in the optical pickup 100, the object lens 103 is disposed in a position fixed against the first light emitting portion 101a and the second light emitting portion 101b, namely, the LD array. Also, the optical pickup 100 is commonly used for a first optical recording medium, such as a CD or a CD-R, and a second optical recording medium, such as a DVD, having a smaller substrate thickness than the first optical recording medium. In other words, the optical recording medium 110 can be selected from the first and second optical recording media, and the optical pickup 100 changes its position against the optical recording medium 110 in accordance with the type of the optical recording medium 110.

In FIG. 1A, the recording face of the optical recording medium 110 (that is, one face not opposing the object lens 103 out of the main faces of the optical recording medium 110) is shown with a solid line when the optical recording medium 110 is a CD or a CD-R (namely, the first optical recording medium) and with a broken line when the optical recording medium 110 is a DVD (namely, the second optical recording medium).

In an optical pickup like the optical pickup 100 having the integration architecture in which the unit having the object lens fixed thereon is moved against each of different types of optical recording media, two light emitting portions of semiconductor laser diodes switched to emit light in accordance with the type of optical recording medium are arranged in the substantially same position on the optical path. Specifically, the optical path from each light emitting portion to the object lens is fixed and the distances from the respective light emitting portions to the object lens are substantially the same. In other words, the distance from the object lens to the optical recording medium alone is variable. According to the present invention, these conditions and a difference in the wavelength of laser beams emitted from the two light emitting portions to be switched are utilized, so as to provide an object lens having a numerical aperture NA changed in accordance with each of the two types of optical recording media that are different in the laser wavelength necessary for the recording/reproducing, and a method for designing the object lens.

Specifically, between the recording/reproducing of the first optical recording medium (such as a CD or a CD-R) and that of the second optical recording medium (such as a DVD), the necessary laser wavelength, the numerical aperture NA of the object lens, the height of the recording face and the spot diameter of a focused laser beam are different. Therefore, in order to cope with these differences, premising that a laser beam is focused by moving the whole optical pickup 100, the object lens is designed in this embodiment as follows: As shown in FIG. 1B, the object lens 103 of this embodiment is composed of a circular center region 103a including the lens optical axis, a ring-shaped peripheral region 103c and a ring-shaped intermediate region 103b sandwiched between the center region 103a and the peripheral region 103c. In the case where, as shown in FIG. 1A, the first light emitting portion 101a of the LD/PD integration unit 101 emits a laser beam 105A of a wavelength (of, for example, 790 nm) suitable to a CD or a CD-R, the laser beam 105A enters the object lens 103 after passing through the diffraction optical device 102. The object lens 103 is designed so that portions of the laser beam 105A respectively passing through the center region 103a and the intermediate region 103b can be focused on the recording face of the CD or the CD-R (namely, the first optical recording medium) but a portion of the laser beam 105A passing through the peripheral region 103c can be out of focus and cannot be focused on this recording face. On the other hand, in the case where, as shown in FIG. 1A, the second light emitting portion 101b of the LD/PD integration unit 101 emits a laser beam 105B of a wavelength (of, for example, 660 nm) suitable to a DVD, the laser beam 105B enters the object lens 103 after passing through the diffraction optical device 102. The object lens 103 is designed so that portions of the laser beam 105B respectively passing through the center region 103a and the peripheral region 103c can be focused on the recording face of the DVD (namely, the second optical recording medium) but a portion of the laser beam 105B passing through the intermediate region 103b can be out of focus and cannot be focused on this recording face.

Such object lens design is carried out by setting the numerical aperture NA of the object lens for obtaining a spot diameter necessary for the recording/reproducing of a CD or a CD-R, that is, the first optical recording medium, to 0.45 and setting the numerical aperture NA of the object lens for obtaining a spot diameter necessary for the recording/reproducing of a DVD, that is, the second optical recording medium, to 0.60. When a circumferential portion of the lens with the maximum diameter for allowing light to pass through and to be focused on a recording face of an optical recording medium (which portion corresponds to the outer circumference of the intermediate region 103b in using the laser beam 105A and the outer circumference of the peripheral region 103c in using the laser beam 105B) is at an angle θ against the optical axis when seen from the focal point and has a refractive index n (which is 1 in the case of the air), the numerical aperture NA is defined as follows: NA=n·sin θ. Accordingly, when a lens region for allowing light to pass through but not to be focused on the recording face is controlled in accordance with switching of the wavelength of the irradiation light, the change of the numerical aperture NA, namely, change of the spot diameter, can be controlled. Also, in order to make light having passed through a predetermined region of the lens be out of focus on a recording face, the lens is designed so that the spherical aberration in this predetermined region of the lens can be abruptly changed when the wavelength of the light emitted from the semiconductor laser diode is switched in accordance with the type of optical recording medium. Such lens design is carried out, specifically, while adjusting lens characteristics so that the spot diameter of the focused light may have a necessary value and the side lobe may have a predetermined value or less.

In the object lens 103 of this embodiment, the circular center region 103a of the object lens 103 is used for focusing the light on both the first and second optical recording media, and therefore, the utilization of the quantity of light entering the object lens 103 can be high.

Next, specific design examples of the optical pickup 100 and the object lens 103 will be described.

Figures 2A, 2B:
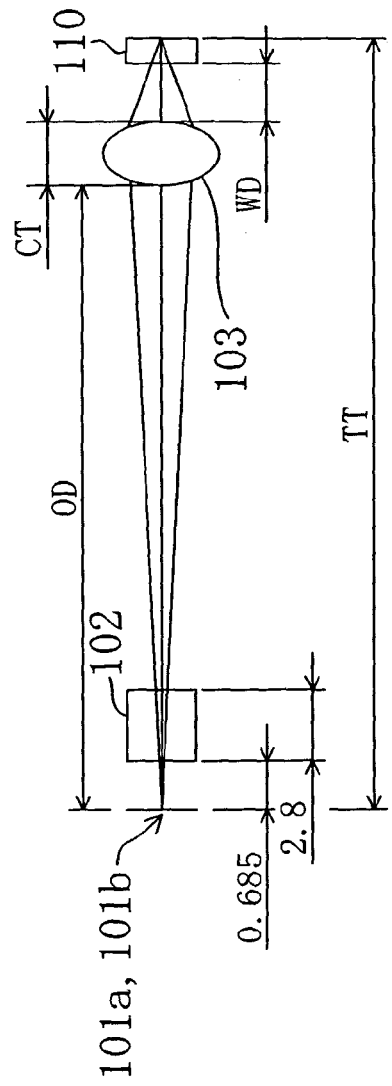
FIG. 2A is a table of values of design parameters employed, in the case where an optical recording medium is a DVD or a CD, in a design example 1 and a design example 2 based on a method for designing an object lens according to the embodiment of the invention.
FIG. 2B is a diagram for explaining the relationship among the respective design parameters in an optical arrangement of an optical pickup and an optical recording medium.

FIG. 2A shows design examples 1 and 2 employed when the optical recording medium 110 is a DVD or a CD. Specifically, the focal length of the object lens 103, the effective diameter R1 of the object lens 103 on its light incident face, the effective diameter R2 of the object lens 103 on its light outgoing face, the total length of the optical path (TT) from the light emitting portion 101a or 101b of the LD/PD integration unit 101 to the recording face of the optical recording medium 110, the distance (OD) from the light emitting portion 101a or 101b to the light incident face of the object lens 103, the thickness (CT) of the object lens 103 and the distance (WD) from the light outgoing face of the object lens 103 to the surface of the optical recording medium 110 are listed. The values of the effective diameters R1 and R2 are determined, in consideration of the relationship with the focal length, so that the numerical aperture NA can be suitable to the pit diameter of each of the DVD and the CD. Also, the units of numerical values listed in FIG. 2A are all millimeters.

FIG. 2B is a diagram for explaining the relationship among the respective design parameters of TT, OD, CT and WD in the optical arrangement of the optical pickup 100 and the optical recording medium 110. In FIG. 2B, like reference numerals are used to refer to like elements shown in FIG. 1A. Also, in the design examples 1 and 2, the distance from the light emitting portion 101a or 101b to the diffraction optical device 102 is 0.685 mm and the diffraction optical device 102 has a thickness of 2.8 mm as shown in FIG. 2B. Furthermore, although not shown in the drawing, in both the design examples, the distance between the light emitting portion 101a and the light emitting portion 101b is 120 μm, and the distance from the surface of the optical recording medium 110 to the recording face thereof is 0.6 mm in a DVD and 1.2 mm in a CD. Moreover, in both the design examples, the refractive index of the material for the diffraction optical device 102 is set to 1.525250, the refractive index of the material for the object lens 103 is set to 1.530473 and the refractive index of the optical recording medium 110 is set to 1.5585203, whereas these refractive indexes are against a laser beam of a wavelength of 660 nm.

In this embodiment, the object lens 103 is designed as a lens represented by an aspheric equation, for example, as follows:

$$z = \frac{\left(\frac{1}{R}\right)x^2}{1+\sqrt{1-(1+k)(\frac{1}{R})^2 x^2}} + A_4 x^4 + A_6 x^6 + A_8 x^8 + A_{10} x^{10}$$

In this equation, z indicates a position on the lens surface along the thickness direction with the lens center set as the origin (with positions on the side closer to the optical recording medium set as +positions), and x indicates a position on the lens surface along the width direction with the lens center set as the origin (with positions on the right hand side of the +positions along the thickness direction set as +positions). Also, R indicates the curvature of the lens, and k, $A_4$, $A_6$, $A_8$ and $A_{10}$ indicate aspheric coefficients.

Figure 3:
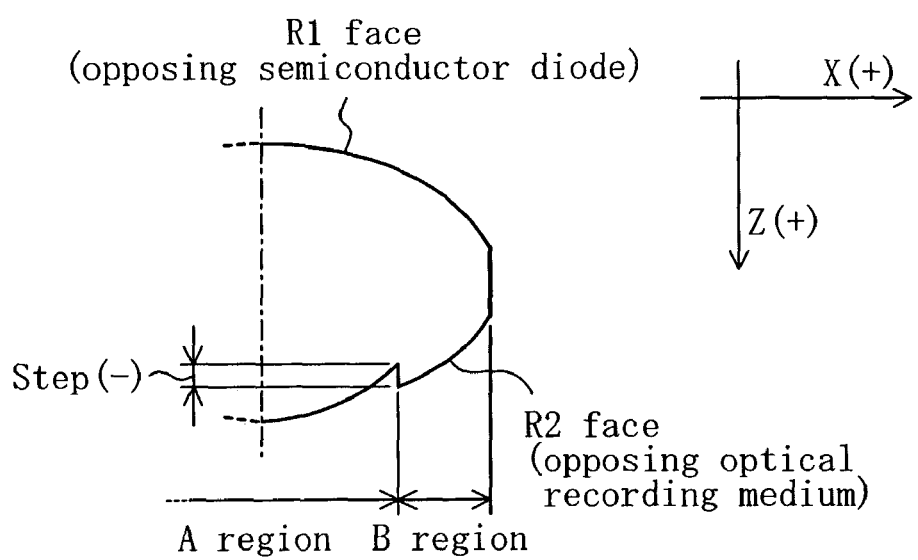
FIG. 3 is a partial view for showing the outline of an object lens designed by the method for designing an object lens according to the embodiment of the invention.

Specifically, the object lens 103 of this embodiment is designed as follows: The circular center region 103a including the lens optical axis commonly used for a DVD, a CD and a CD-R and the intermediate region 103b used for a CD or a CD-R alone are designed as one lens A, and the peripheral region 103c used for a DVD alone is designed as one lens B. These lenses A and B are bonded and integrated to each other to obtain the object lens 103. FIG. 3 is a partial view for showing the outline of the object lens 103 thus designed. In FIG. 3, the lens optical axis is shown with a long dashed short dashed line. As shown in FIG. 3, the bonding portion between the lens A and the lens B may be in a step shape.

FIGS. 4 and 5 are tables for listing values of the design parameters including the aspheric coefficients employed in the design example 1 and the design example 2, respectively. In FIGS. 4 and 5, an "R1 face" indicates the lens face opposing the semiconductor laser diode and an "R2 face" indicates the lens face opposing the optical recording medium. Also, an "A region" indicates a region corresponding to the center region 103a commonly used for a DVD, a CD and a CD-R and the intermediate region 103b used for a CD or a CD-R alone, and a "B region" indicates a region corresponding to the peripheral region 103c used for a DVD alone. Furthermore, the respective numerical values employed in the design example 1 and listed in FIG. 4 are determined so as to attain a lens edge thickness of 0.4 mm or less, and the respective numerical values employed in the design example 2 and listed in FIG. 5 are determined so as to attain a lens edge thickness of approximately 0.8 mm and make other design items similar to those attained by the design example 1.

Figure 6A:
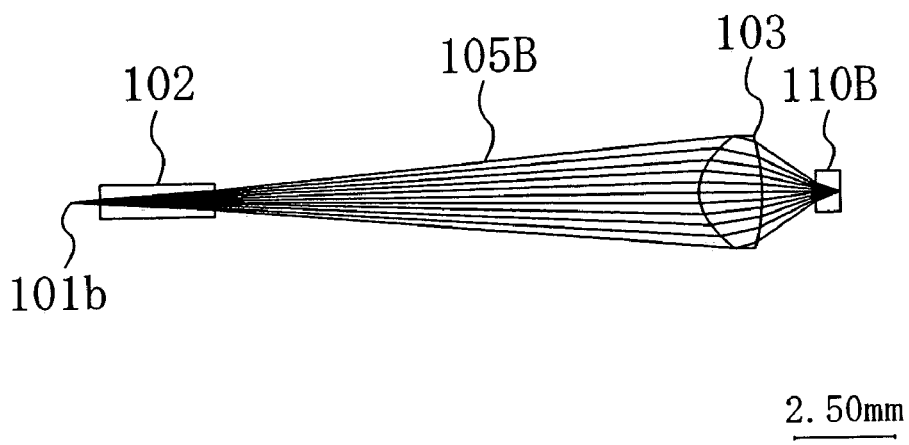
FIG. 6A is a diagram of an optical path, obtained when the optical recording medium is a DVD, corresponding to the design example 1 based on the method for designing an object lens according to the embodiment of the invention.
Figure 6B:
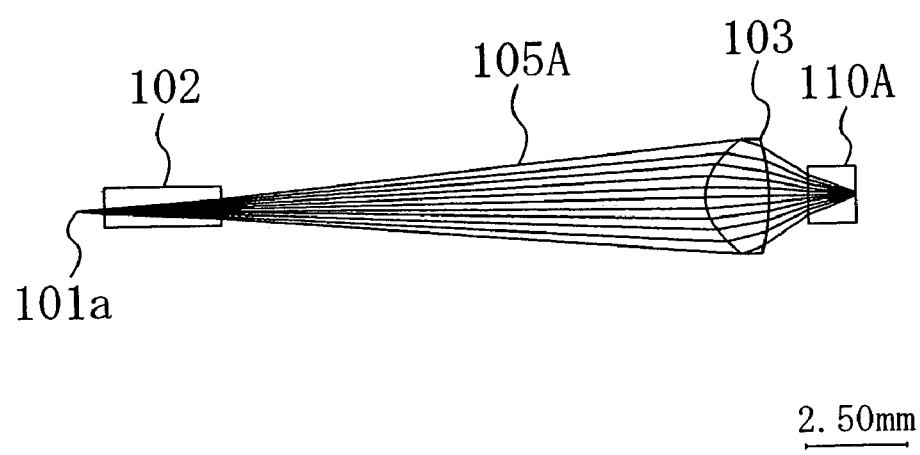
FIG. 6B is a diagram of an optical path, obtained when the optical recording medium is a CD, corresponding to the design example 1 based on the method for designing an object lens according to the embodiment of the invention.
Figure 7A:
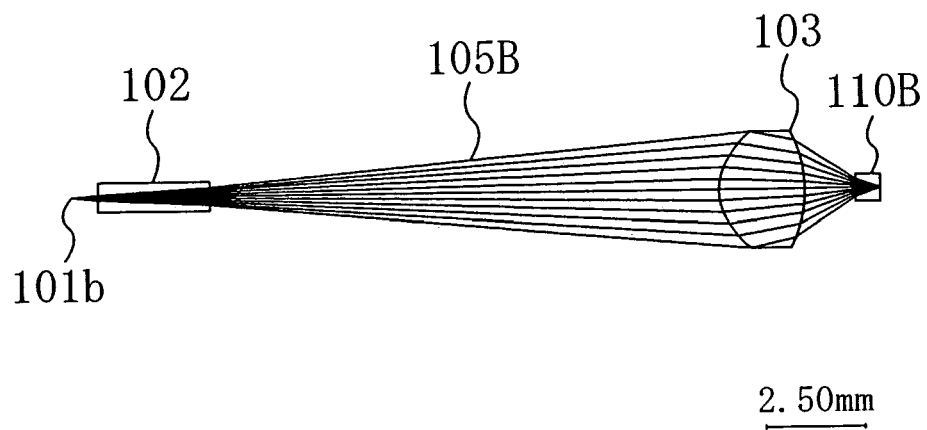
FIG. 7A is a diagram of an optical path, obtained when the optical recording medium is a DVD, corresponding to the design example 2 based on the method for designing an object lens according to the embodiment of the invention.
Figure 7B:
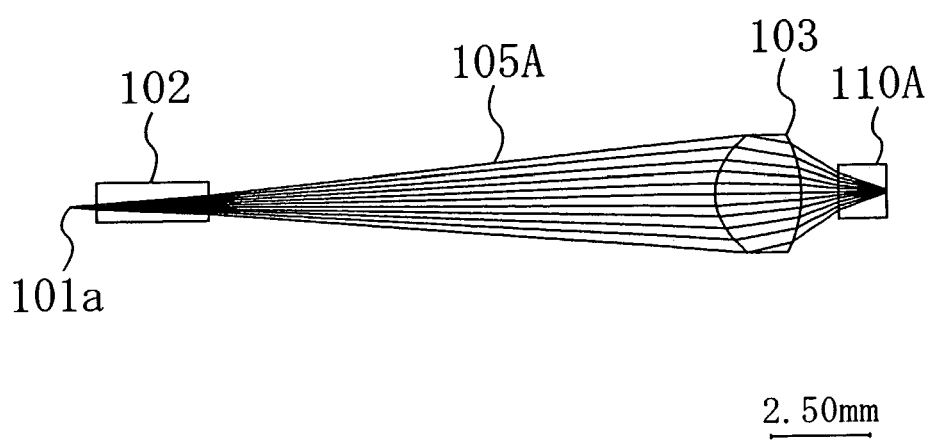
FIG. 7B is a diagram of an optical path, obtained when the optical recording medium is a CD, corresponding to the design example 2 based on the method for designing an object lens according to the embodiment of the invention.

FIG. 6A is a diagram of the optical path (namely, the optical path of a laser beam in the optical arrangement of the optical pickup 100 and the optical recording medium 110) obtained by the design example 1 when the optical recording medium is a DVD, and FIG. 6B is a diagram of the optical path obtained by the design example 1 when the optical recording medium is a CD. Also, FIG. 7A is a diagram of the optical path obtained by the design example 2 when the optical recording medium is a DVD, and FIG. 7B is a diagram of the optical path obtained by the design example 2 when the optical recording medium is a CD. In FIGS. 6A, 6B, 7A and 7B, like reference numerals are used to refer to like elements shown in FIG. 1A. Also, in FIGS. 6A and 7A, a reference numeral 110B denotes a DVD, and in FIGS. 6B and 7B, a reference numeral 110A denotes a CD. Each of these diagrams of the optical paths is synthesized with the optical pickup 110 moved for focusing against the recording face (i.e., the face not opposing the object lens 103) of the DVD 110B or the CD 110A.

FIG. 8 is a table of optical magnifications of the object lenses 103 designed by the design example 1 and the design example 2.

In the present invention, the object lens is made to be out of focus by utilizing the lens characteristics, so as to attain a similar effect to that attained by providing a numerical aperture limiting device for changing the numerical aperture NA. Actually, according to the invention, substantially the same effect as that attained by using the numerical aperture limiting device can be attained with respect to the wave aberration of a DVD having large numerical aperture NA.

Figure 9A:
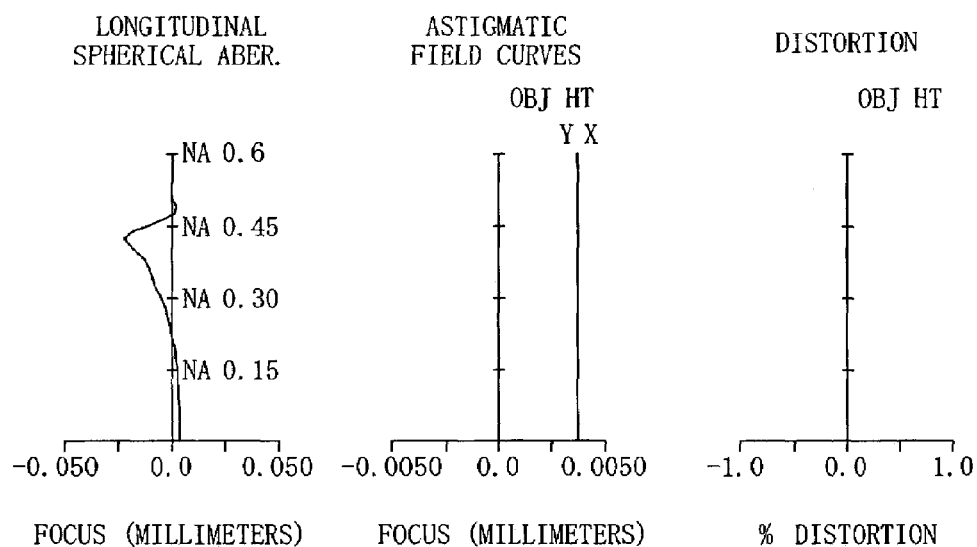
FIG. 9A is a diagram for showing spherical aberration, astigmatism and distortion caused, when the optical recording medium is a DVD, by the object lens designed by the design example 1 based on the method for designing an object lens according to the embodiment of the invention.
Figure 9B:
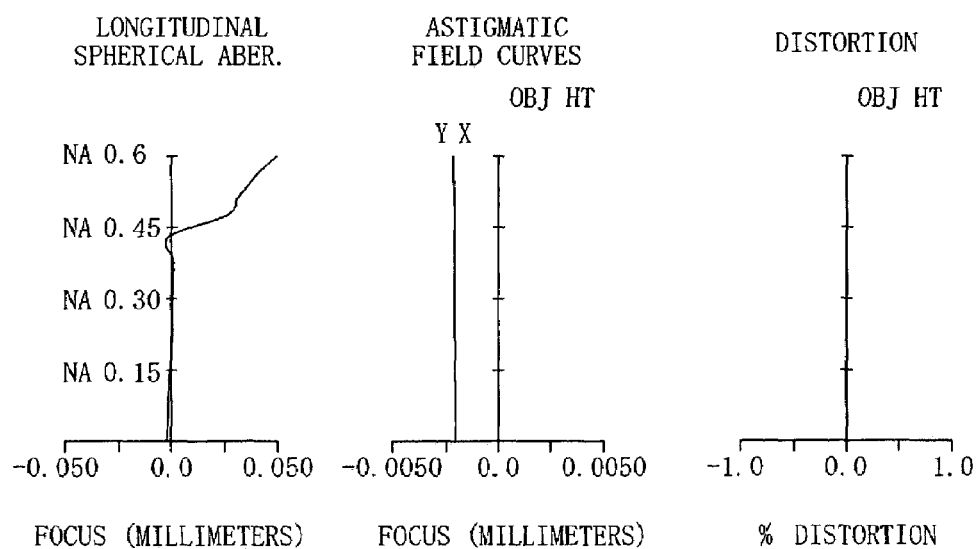
FIG. 9B is a diagram for showing spherical aberration, astigmatism and distortion caused, when the optical recording medium is a CD, by the object lens designed by the design example 1 based on the method for designing an object lens according to the embodiment of the invention.
Figure 10A:
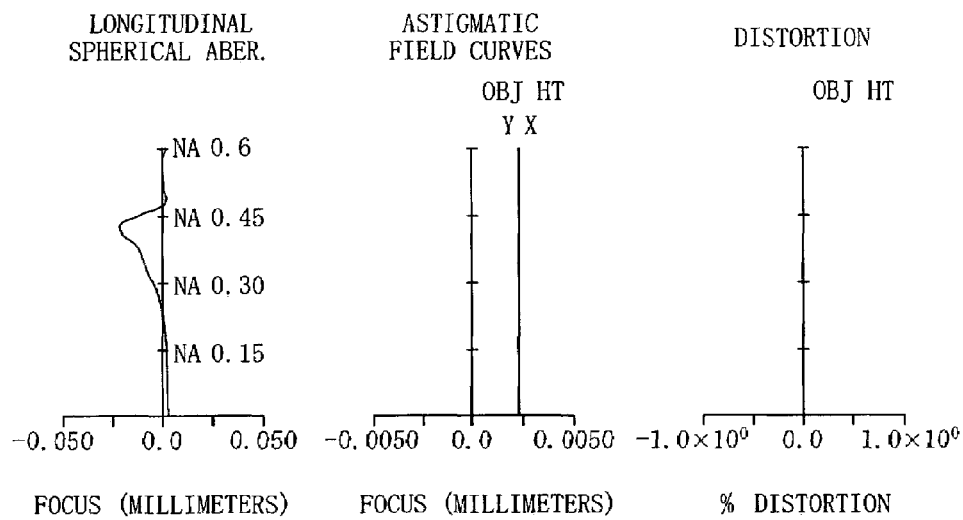
FIG. 10A is a diagram for showing spherical aberration, astigmatism and distortion caused, when the optical recording medium is a DVD, by the object lens designed by the design example 2 based on the method for designing an object lens according to the embodiment of the invention.
Figure 10B:
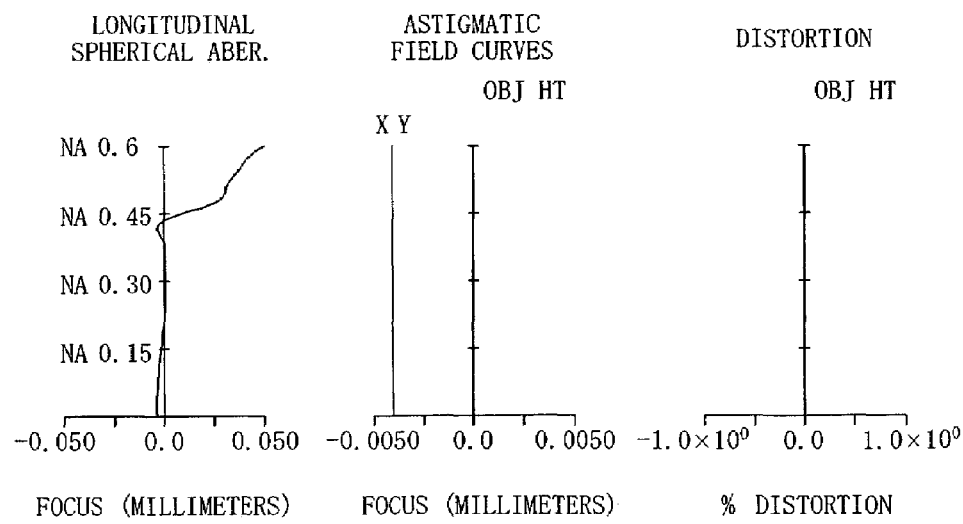
FIG. 10B is a diagram for showing spherical aberration, astigmatism and distortion caused, when the optical recording medium is a CD, by the object lens designed by the design example 2 based on the method for designing an object lens according to the embodiment of the invention.

FIG. 9A shows the spherical aberration, the astigmatism and the distortion obtained by the design example 1 when the optical recording medium is a DVD, and FIG. 9B shows the spherical aberration, the astigmatism and the distortion obtained by the design example 1 when the optical recording medium is a CD. Also, FIG. 10A shows the spherical aberration, the astigmatism and the distortion obtained by the design example 2 when the optical recording medium is a DVD, and FIG. 10B shows the spherical aberration, the astigmatism and the distortion obtained by the design example 2 when the optical recording medium is a CD.

Figure 11A:
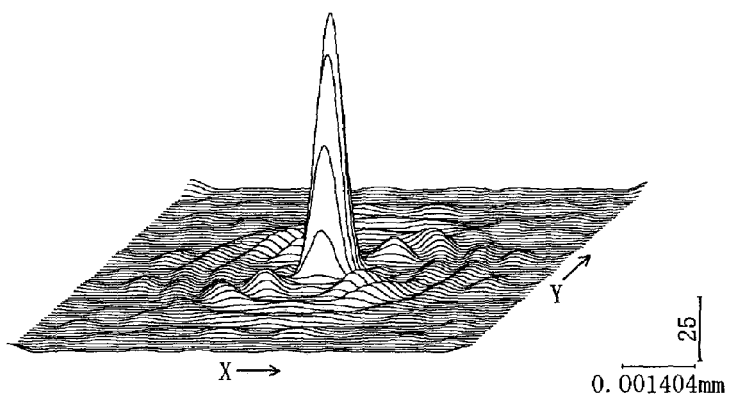
FIG. 11A is a diagram of the distribution of point image intensity (without numerical aperture limited) obtained, when the optical recording medium is a DVD, by the object lens designed by the design example 1 based on the method for designing an object lens according to the embodiment of the invention.
Figure 11B:
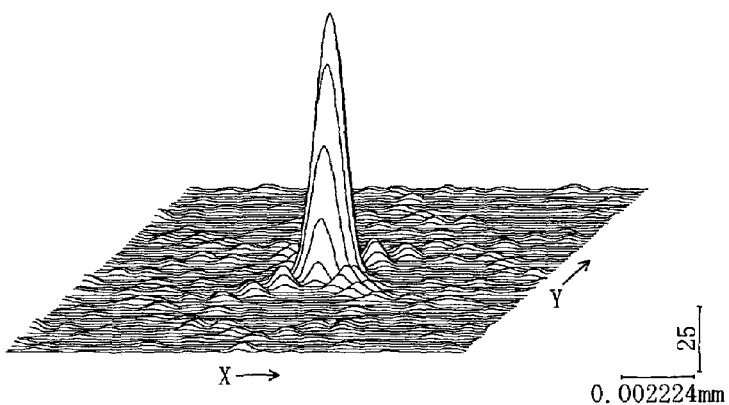
FIG. 11B is a diagram of the distribution of point image intensity (without numerical aperture limited) obtained, when the optical recording medium is a CD, by the object lens designed by the design example 1 based on the method for designing an object lens according to the embodiment of the invention
Figure 11C:
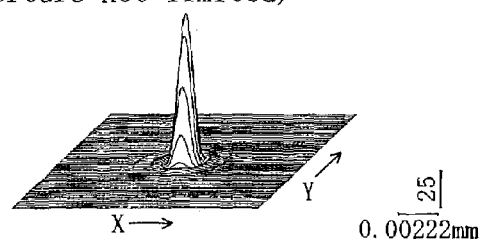
FIG. 11C is a diagram of the distribution of point image intensity (with numerical aperture limited) obtained, when the optical recording medium is a CD, by an object lens designed by a comparative design example 1.
Figure 12A:
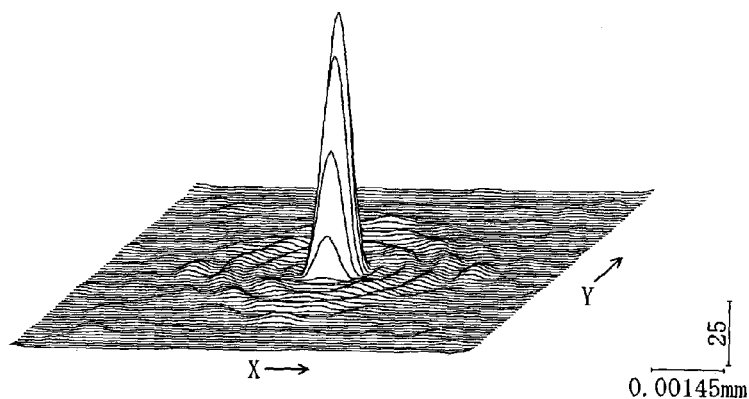
FIG. 12A is a diagram of the distribution of point image intensity (without numerical aperture limited) obtained, when the optical recording medium is a DVD, by the object lens designed by the design example 2 based on the method for designing an object lens according to the embodiment of the invention.
Figure 12B:
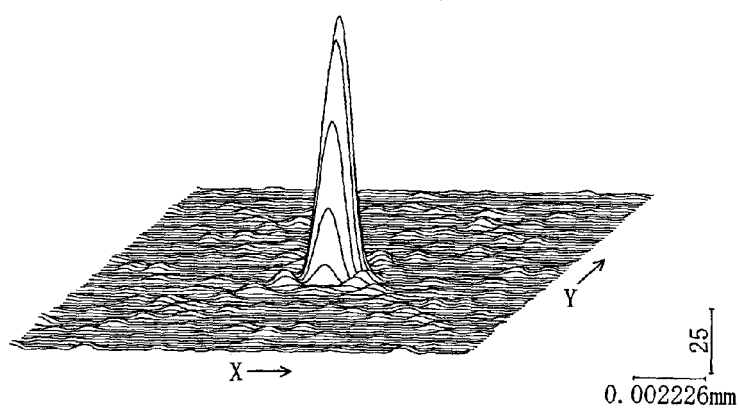
FIG. 12B is a diagram of the distribution of point image intensity (without numerical aperture limited) obtained, when the optical recording medium is a CD, by the object lens designed by the design example 2 based on the method for designing an object lens according to the embodiment of the invention
Figure 12C:
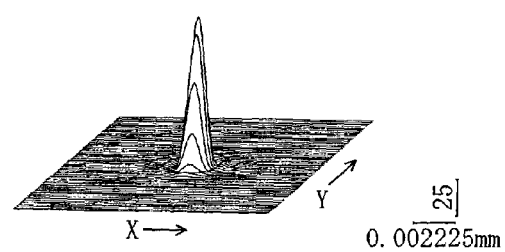
FIG. 12C is a diagram of the distribution of point image intensity (with numerical aperture limited) obtained, when the optical recording medium is a CD, by an object lens designed by a comparative design example 2.

FIG. 11A shows the distribution of point image intensity (without numerical aperture limited) obtained by the design example 1 when the optical recording medium is a DVD, FIG. 11B shows the distribution of point image intensity (without numerical aperture limited) obtained by the design example 1 when the optical recording medium is a CD, and FIG. 11C shows the distribution of point image intensity (with numerical aperture limited) obtained by a comparative design example 1 when the optical recording medium is a CD. Also, FIG. 12A shows the distribution of point image intensity (without numerical aperture limited) obtained by the design example 2 when the optical recording medium is a DVD, FIG. 12B shows the distribution of point image intensity (without numerical aperture limited) obtained by the design example 2 when the optical recording medium is a CD, and FIG. 12C shows the distribution of point image intensity (with numerical aperture limited) obtained by a comparative design example 2 when the optical recording medium is a CD. In the comparative design example 1,the numerical aperture is limited in the peripheral region 103c used for a DVD alone of the object lens 103 designed by the design example 1,and in the comparative design example 2,the numerical aperture is limited in the peripheral region 103c used for a DVD alone of the object lens 103 designed by the design example 2.

As shown in FIGS. 11A, 11B, 12A and 12B, the object lens 103 of this embodiment attains the point image intensity distribution with few side lobes and with crosstalk suppressed. Thus, it is understood that the object lens 103 of this embodiment is sufficiently practical.

FIG. 13 is a table of values of spot diameters and side lobes obtained from the point image intensity distributions respectively shown in FIGS. 11A through 11C and 12A through 12C. In FIG. 13, the values listed in the row of "Design example 1" and the columns of "Numerical aperture limited" correspond to the comparative design example 1 shown in FIG. 11C, and the values listed in the row of "Design example 2" and the columns of "Numerical aperture limited" correspond to the comparative design example 2 shown in FIG. 12C. Also, in FIG. 13, "CDX" indicates the spot diameter along the X-direction on a CD and "CDY" indicates the spot diameter along the Y-direction on a CD.

As shown in FIG. 13, when the design examples of this embodiment without the numerical aperture limited and the comparative design examples using the numerical aperture limiting device are compared, there is substantially no difference in the values of the spot diameter, and the values of the side lobes attained by this embodiment exhibit a sufficient characteristic for practical use.

FIG. 14A shows a state where the object lens 103 designed by the design example 1 is provided, as a mask for a DVD, with a ring-shaped mask for shielding the intermediate region 103b corresponding to the numerical aperture NA of 0.3 through 0.45. Also, FIG. 14B shows a state where the object lens 103 designed by the design example 1 is provided, as a mask for a CD, with a ring-shaped mask for shielding the peripheral region 103c corresponding to the numerical aperture NA of 0.45 through 0.6. FIG. 14C shows the wave aberration, the spot diameters and the side lobes measured when the object lenses of FIGS. 14A and 14B are used for a DVD and a CD. FIG. 14C additionally shows the wave aberration, the spot diameters and the side lobes measured when the object lens 103 designed by the design example 1 and having no mask is used for a DVD and a CD.

As shown in FIG. 14C, when the object lenses provided with the masks are compared with the object lenses of this embodiment with no masks, although there is a small difference in the measured values of the wave aberration, the measured values of the spot diameters and the side lobes are substantially the same. In other words, the data listed in FIG. 14C reveal that the lens structure with no mask of this embodiment can attain optical characteristics sufficiently practically usable.

Furthermore, FIG. 14D shows values measured in the same manner as in FIGS. 14A through 14C when the object lens 103 is designed to have the intermediate region 103b corresponding to the numerical aperture NA of 0.35 through 0.45. Also the data shown in FIG. 14D reveal that the lens structure with no mask of this embodiment can attain optical characteristics sufficiently practically usable.

The values listed in FIG. 14D are obtained, in consideration of errors in processing and assembly, by designing the lens so as to attain wave aberration of 0.03 λRMS or less when a mask is provided. However, if the wave aberration may be degraded nearly to Marechal's limit, the lower limit value of the numerical aperture NA corresponding to the intermediate region 103b can be further increased.

Figure 15:
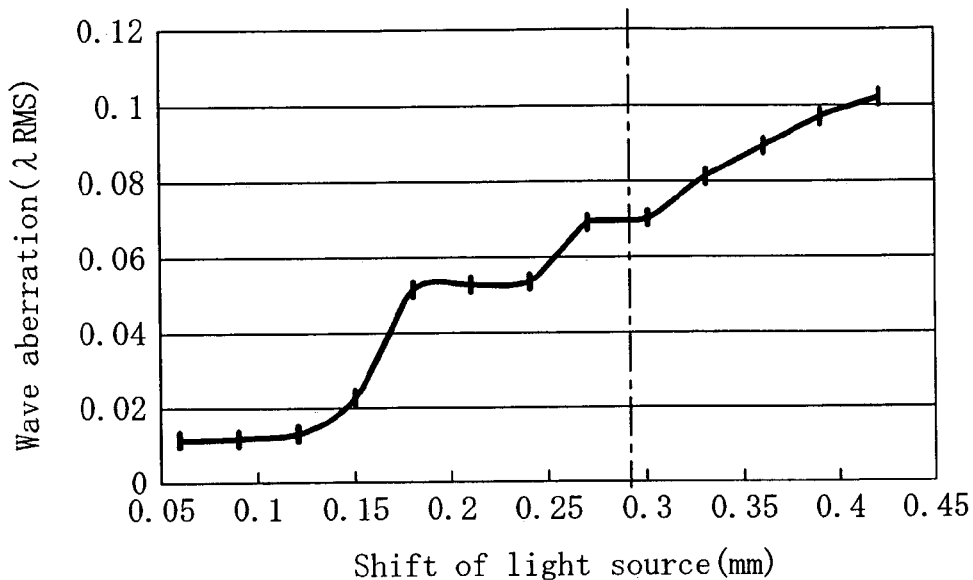
FIG. 15 is a graph for showing change of wave aberration caused by the object lens designed by the design example 2 based on the method for designing an object lens according to the embodiment of the invention against change of the distance between a first light emitting portion and a second light emitting portion when the first light emitting portion of the optical pickup shown in FIG. 1A is positioned on the lens optical axis.
Figure 16A:
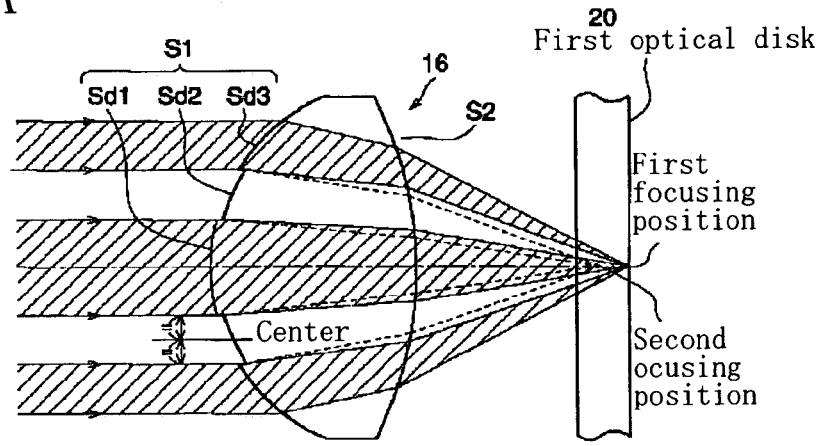
FIG. 16A is a cross-sectional view of an object lens used in a conventional optical pickup and FIG. 16B is a front view of the object lens of FIG. 16A taken from the side of a light source.
Figure 16B:
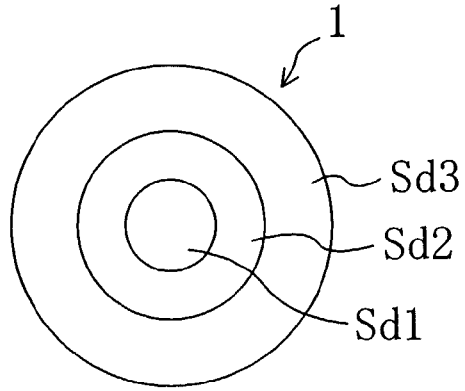
Figure 17:
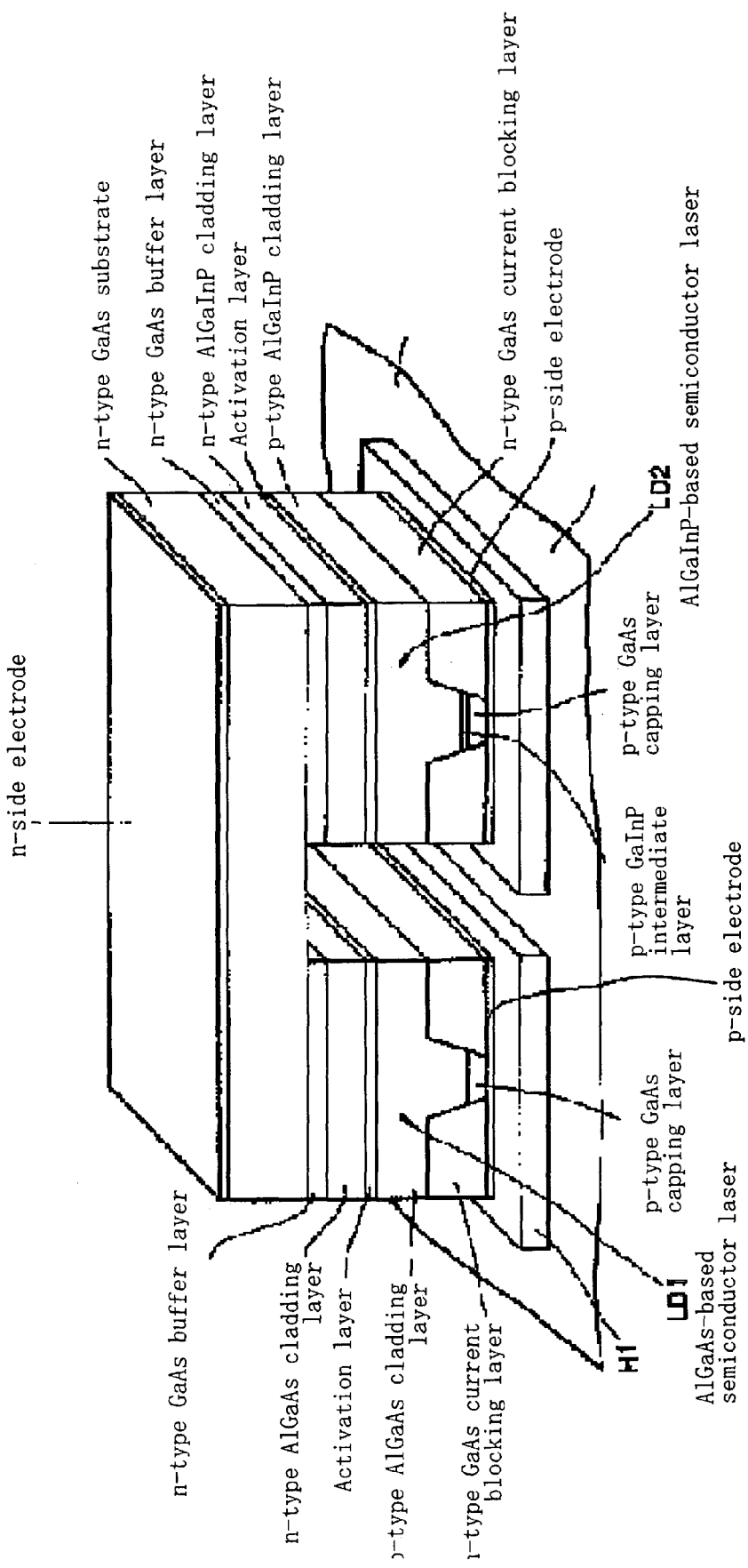
FIG. 17 is a perspective view of a monolithic semiconductor laser diode array in which a red semiconductor laser diode and an infrared semiconductor laser diode are integrated on one substrate.

FIG. 15 shows change of the wave aberration obtained by the design example 2 against change of the distance between the first light emitting portion 101a and the second light emitting portion 101b (namely, shift of the light source) when the first light emitting portion 101a (i.e., the light emitting portion for a CD) of the optical pickup 100 shown in FIG. 1A is positioned on the optical axis.

As shown in FIG. 15, if the wave aberration is allowed to degrade nearly to the Marechal's limit for a CD, the object lens design of this embodiment is effective in the case where the distance between the light emitting portions 101a and 101b is 270 μm (0.27 mm) or less (which corresponds to an area of the drawing on the left hand side of a long dashed short dashed line). In other words, when the distance between the light emitting portions in the semiconductor laser diode array of the optical pickup 100 is 270 μm or less, the wave aberration of the laser spot focused on the recording face of the optical recording medium 110 can fall in an allowable range.

As described so far, the optical pickup 100 records data in or reproduces data from the optical recording medium 110, which is selected from a CD (or a CD-R) and a DVD respectively having recording faces at different heights, by irradiating the optical recording medium 110 with a laser beam of a wavelength suitable to the optical recording medium 110 by using the semiconductor laser diode array including the first light emitting portion 101a and the second light emitting portion 101b respectively emitting light of different wavelengths. The object lens 103 of this embodiment is a finite conjugate type object lens provided on the optical pickup 100 including the semiconductor laser diode array. Also, the numerical aperture NA of the object lens 103 is changed in accordance with the wavelength of a laser beam emitted from the semiconductor laser diode array, so that the laser beam having passed through the object lens 103 can be focused on the recording face of the optical recording medium 110. At this point, since the distances from the light emitting portions 101a and 101b of the semiconductor laser diode array to the object lens 103 are substantially the same, even when divergent rays of the finite optical system enter the object lens 103, the change of the numerical aperture NA of the object lens 103 can be controlled in accordance with the switching of the wavelength of the laser beam emitted from the semiconductor laser diode array. Accordingly, the laser beam having passed through the object lens 103 can be definitely focused on the recording face of the optical recording medium 110 arbitrarily selected from a plurality of optical recording media different in the height of the recording faces.

Furthermore, since the object lens 103 of this embodiment is a finite conjugate type object lens, the optical pickup 100 can be downsized. Moreover, since the optical system of the optical pickup 100 is a finite optical system and the number of optical components of the optical pickup 100 is reduced, the optical pickup 100 can attain a higher operation speed.

Also, the object lens 103 of this embodiment is disposed in the position fixed against the light emitting portions 101a and 101b, namely, the semiconductor laser diode array. Therefore, the distances from the light emitting portions 101a and 101b to the object lens 103 can be definitely made substantially the same.

Furthermore, the object lens 103 of this embodiment includes the circular center region 103a including the lens optical axis, the ring-shaped peripheral region 103c and the ring-shaped intermediate region 103b sandwiched between the center region 103a and the peripheral region 103c. In the case where the first light emitting portion 101a emits the laser beam 105A of a wavelength suitable to a CD or a CD-R, the numerical aperture NA of the object lens 103 is changed so that the portions of the laser beam 105A respectively passing through the center region 103a and the intermediate region 103b can be focused on the recording face of the CD or the CD-R. On the other hand, in the case where the second light emitting portion 101b emits the laser beam 105B of a wavelength suitable to a DVD, the numerical aperture NA of the object lens 103 is changed so that the portions of the laser beam 105B respectively passing through the center region 103a and the peripheral region 103c can be focused on the recording face of the DVD. In other words, in accordance with the substrate thickness of the optical recording medium 110, namely, in accordance with the height of the recording face, the change of the numerical aperture NA of the object lens 103 can be definitely controlled, so as to definitely control the focusing position of the laser beam having passed through the object lens 103. Furthermore, in this embodiment, the center region 103a and the intermediate region 103b of the object lens 103 are defined by an identical lens function, and therefore, the lens can be easily designed.

In this embodiment, the object lens for an optical pickup commonly applicable to a CD or a CD-R and a DVD is described. However, according to the present invention, laser beams respectively passing through a plurality of regions of a lens are controlled to be focused or not to be focused on a recording face by changing the numerical aperture NA in accordance with the wavelength of light emitted by a semiconductor laser diode. Accordingly, the present invention is applicable not only to the optical pickup described in this embodiment but also to the optical system of any optical pickup used for another optical recording medium.

What is claimed is:

1. An object lens for an optical pickup, said object lens being of finite conjugate type for use in an optical pickup having a unit, in which a semiconductor laser diode array including light emitting portions for respectively emitting light of different wavelengths, a photo detector and said object lens are integrated so that a relative positional relationship between said object lens and said semiconductor laser diode array is fixed, and capable of recording data in and reproducing data from a first optical recording medium and a second optical recording medium respectively having recording faces at different heights, optical paths from said light emitting portions for respectively emitting light of different wavelengths to the object lens being the same regardless of wavelength, a distance from the light outgoing face of the object lens to the surface of said first and second optical recording mediums in an optical system being changed by moving said unit entirely, and curvatures and aspheric coefficients of said object lens being defined so that said object lens has a plurality of numerical apertures to be changed in accordance with switching between said different wavelengths, whereby allowing said laser beam to be focused on said first optical recording medium or said second optical recording medium.

2. The object lens of claim 1,
wherein a distance between said light emitting portions of said semiconductor laser diode array is 270 μm or less.

3. The object lens of claim 1,
wherein change of the numerical aperture of said object lens is controlled in accordance with the switching between said different wavelengths in such a manner that, in the case where a laser beam of a wavelength suitable to said first optical recording medium is allowed to pass through said object lens for irradiating said first optical recording medium, portions of said laser, beam respectively passing through a circular center region including a lens optical axis and a ring-shaped intermediate region around said center region are focused on the recording face of said first optical recording medium, and that in the case where a laser beam of another wavelength suitable to said second optical recording medium is allowed to pass through said object lens for irradiating said second optical recording medium, portions of said laser beam respectively passing through said center region and a ring-shaped peripheral region around said intermediate region are focused on the recording face of said second optical recording medium.

4. The object lens of claim 3,
wherein said center region and said intermediate region are defined by an identical lens function.

5. A method for designing an object lens for an optical pickup,
said object lens being of finite conjugate type for use in an optical pickup having a unit, in which a semiconductor laser diode array including light emitting portions for respectively emitting light of different wavelengths, a photo detector and said object lens are integrated so that a relative positional relationship between said object lens and said semiconductor laser diode array is fixed, and capable of recording data in or reproducing data from a first optical recording medium and a second optical recording medium respectively having recording faces at different heights, wherein a distance from the light outgoing face of the object lens to the surface of said first and second optical recording mediums in an optical system being changed by moving said unit entirely, and in a condition where optical paths from said light emitting portions for respectively emitting light of different wavelengths to the object lens are the same regardless of wavelength, curvatures and aspheric coefficients of said object lens are defined so that said object lens has a plurality of numerical apertures to be changed in accordance with switching between said different wavelengths for allowing said laser beam to be focused on said first optical recording medium or said second optical recording medium.

6. The object lens of claim 1,
wherein spherical aberration in a predetermined region of said object lens is changed.

7. The object lens of claim 1,
wherein said semiconductor laser diode array is a monolithic semiconductor laser diode array including light emitting portions integrated on one substrate for emitting light of different wavelengths.

* * * * *